United States Patent [19]

Ueda et al.

[11] Patent Number: 4,929,934

[45] Date of Patent: May 29, 1990

[54] PRESSURE-SENSITIVE INPUT APPARATUS

[75] Inventors: Kenichi Ueda; Kouji Hattori; Akihiko Terada; Kazuyoshi Inohara, all of Tokyo, Japan

[73] Assignee: Oki Electric Industry Co., Ltd., Tokyo, Japan

[21] Appl. No.: 247,782

[22] Filed: Sep. 22, 1988

[30] Foreign Application Priority Data

Sep. 28, 1987 [JP] Japan .................. 62-240961

[51] Int. Cl.$^5$ .................. G08C 21/00
[52] U.S. Cl. .................. 340/706; 178/18; 178/19
[58] Field of Search .................. 340/706, 709, 712; 178/18, 19

[56] References Cited

U.S. PATENT DOCUMENTS 4,819,194  4/1989  Koizumi et al. .................. 178/18

FOREIGN PATENT DOCUMENTS 0034543  7/1982  Japan .

OTHER PUBLICATIONS

"Pressure Sensitive Graphic Input Device" Institute of Electronics and Communications Engineers of Japan, IE81-7, May 1981, pp. 1-6.

Primary Examiner—Alvin Oberley
Attorney, Agent, or Firm—Spencer & Frank

[57] ABSTRACT

In a pressure-sensitive input apparatus comprising an X-coordinate detection resistive member connected to mutually parallel vertical electrodes and a Y-coordinate detection resistive member connected to mutually parallel horizontal electrodes, for detecting the position of a point depressed by a stylus or the like, by detecting changes in the resistance values of these resistive members, switches are provided for on-off control of the current flowing into or out of both ends of the X-coordinate detection resistive member and the Y-coordinate detection resistive member, and a voltage detection circuit detects the voltage between the X-coordinate detection resistive member and the Y-coordinate detection resistive member. Multiple inputs can be detected according to the results obtained from the voltage detection circuit when the currents are switched by the switches.

11 Claims, 6 Drawing Sheets

PRESSURE-SENSITIVE INPUT APPARATUS

BACKGROUND OF THE INVENTION

This invention relates to a pressure-sensitive input apparatus that operates by detecting variations in electrical resistance, and particularly to an improvement for detecting input at multiple locations.

A prior-art example of a pressure-sensitive input apparatus that operates by detecting variations in electrical resistance is described in *Technical Paper of the Institute of Electronics and Communications Engineers of Japan* IE81-7, May 1981, pp. 1–6 published by the Institute of Electronics and Communications Engineers of Japan. This apparatus is capable of detecting the positional coordinates of an input at a single point only on a pressure-sensitive input surface.

FIG. 1 shows the typical principle of operation of a prior art pressure-sensitive input apparatus that operates by detecting variations in electrical resistance. This input apparatus comprises an input panel N which includes a group of vertical electrodes 1 and a group of horizontal electrodes 2, which extend orthogonally with respect to the vertical electrodes 1. Disposed between the vertical electrodes 1 and the horizontal electrodes 2 is a pressure-sensitive sheet 5. The electrical resistance of the pressure-sensitive sheet 5 is reduced at location where a pressure is applied in the thickness direction. As an alternative, the vertical electrodes 1 and the horizontal electrodes 2 are separated by an air gap, in which case the vertical electrodes or the horizontal electrodes are resiliently deformed until they are in contact with each other. In both groups, the electrodes 1 and 2 are disposed parallel to one another, and the pitch of the electrodes corresponds to the resolution of the input apparatus. Connected to these groups of electrodes 1 and 2 and disposed orthogonally to each other are an X-coordinate detection resistive member 3 and a Y-coordinate detection resistive member 4, both of which have a uniform lengthwise resistivity (resistance per unit length). The horizontal electrodes 2 are covered with a protective, insulating sheet, not shown. The details of the structure of the input panel N is known in the art. Examples of the input panel are shown in Japanese Patent Application Publication No. 34543/1982, which is hereby incorporated by reference and further explanation thereof is omitted.

A constant-current source 6 is further connected as shown in the drawing, and current detection circuits 7 and 8 are provided. A positional coordinate calculation circuit 10 is provided to receive the outputs from the current detection circuits 7 and 8 to calculate the positional coordinate of the point P at which the stylus S is applied.

The apparatus operates as follows. Suppose there is an input at a point P located at a position x on the X axis and y on the Y axis, as measured from the origin O of the effective input area. At the point P at which pressure is applied, the electrical resistance in the thickness direction of the pressure-sensitive sheet (or air gap) 5 is reduced, so the electrodes in the group of vertical electrodes 1 and the group of horizontal electrodes 2 at this point are connected through a contact resistance $r_c$. The equivalent circuit at this moment is shown in FIG. 2, in which $R_x$ is the total resistance of the X-coordinate detection resistive member 3, $R_y$ is the total resistance of the Y-coordinate detection resistive member 4, $I_o$ is the current value of the constant-current source 6, and $P_x$ and $P_y$ are the points on the X-coordinate and Y-coordinate detection resistive members 3 and 4, respectively, at which the vertical and horizontal electrodes 1 and 2 are connected.

The following relationship is easily derived from the equivalent circuit in FIG. 2.

$$x = L_x \cdot i_2 / I_o \quad (1)$$

$$y = L_y \cdot i_4 / I_o \quad (2)$$

where $L_x$ and $L_y$ denote dimensions of the effective input area in the x- and y-directions, respectively. Since $L_x$, $L_y$, and $I_o$ are constants, x is directly proportional to $i_2$ and y is directly proportional to $i_4$. The positional coordinate (x, y) of the point P at which pressure was applied can therefore be found by measurement of the current values $i_2$ and $i_4$ by the current detection circuits 7 and 8. An important point to note is that the position can be detected independently of the contact resistance $r_c$ between the vertical and horizontal electrodes 1 and 2.

A problem in the apparatus described above is that when there is input at multiple points, which may occur when the input surface is touched by simultaneously the input stylus S and another object such as a finger at a pressure exceeding the threshold value, it is not possible to detect the correct position. Moreover, the prior-art apparatus is not able to detect that a multiple input has occurred. Accordingly, a value quite different from the coordinate of the position intended by the operator may be erroneously obtained and supplied to a data processing device connected to the pressure-sensitive input device.

SUMMARY OF THE INVENTION

An object of the present invention is to solve the preceding problem in the prior art.

Another object of the invention is to provide a pressure-sensitive input apparatus with a superior man-machine interface capable of detecting multiple inputs and warning the operator, thereby preventing incorrect inputs.

This invention relates to a pressure-sensitive input apparatus comprising an X-coordinate detection resistive member connected to mutually parallel vertical electrodes and a Y-coordinate detection resistive member connected to mutually parallel horizontal electrodes, and separated from the vertical electrodes by a pressure-sensitive sheet or air gap, which detects the position of a point depressed by a stylus or the like by detecting changes in the electric currents through respective ends of the resistive members.

To solve the aforementioned problem of the prior art, this invention provides switching means for on-off control of the current flowing into or out of both ends of the X-coordinate detection resistive member and the Y-coordinate detection resistive member, and voltage detection means for detecting the voltage between the X-coordinate detection resistive member and the Y-coordinate detection resistive member, and a decision is made as to whether the detected values obtained by the voltage detection means under each set of on-off conditions satisfy a predetermined condition. This condition is set on the basis of the fact that if during input with the stylus the operator inadvertently applies pressure elsewhere, in general both the x coordinates and the y coordinates of the multiple input positions will differ. When a multiple input is detected the result of the calculation of the coordinate is disregarded or the calculation is disabled, and/or warning is given to the operator. Thus, the input of the positions not intended by the operator can be prevented.

DETAILED DESCRIPTION OF THE EMBODIMENTS

Figure 1:
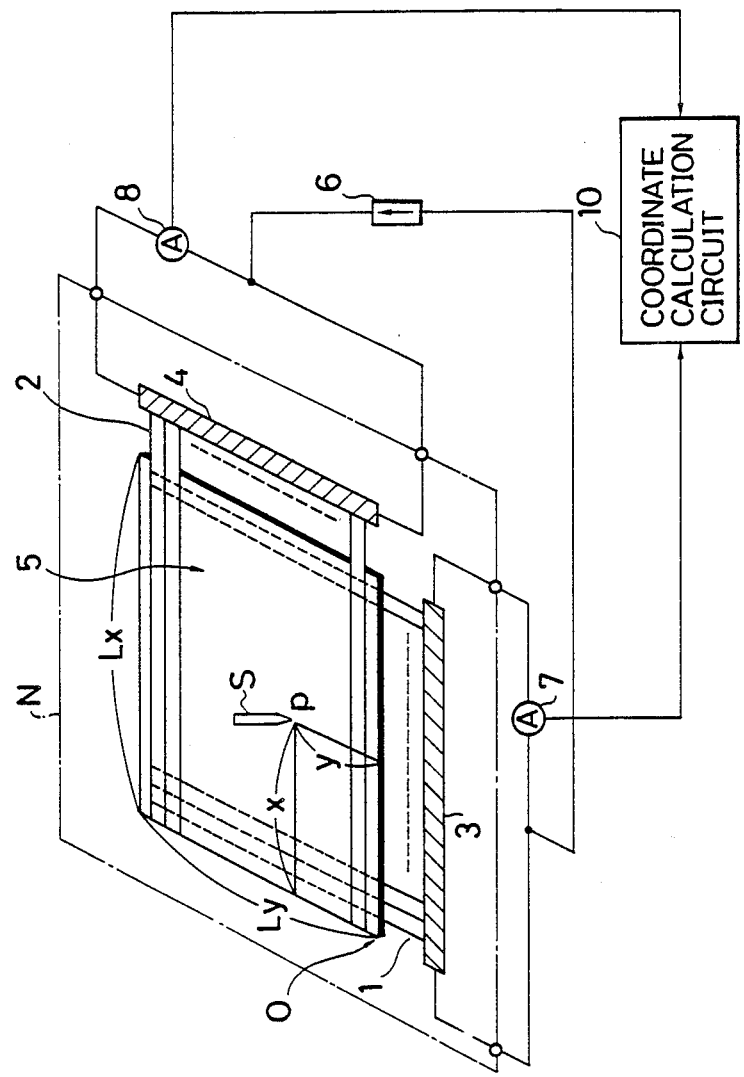
FIG. 1 illustrates the principle of operation of a prior-art pressure-sensitive input apparatus that operates by detecting variations in electrical resistance.
Figure 3:
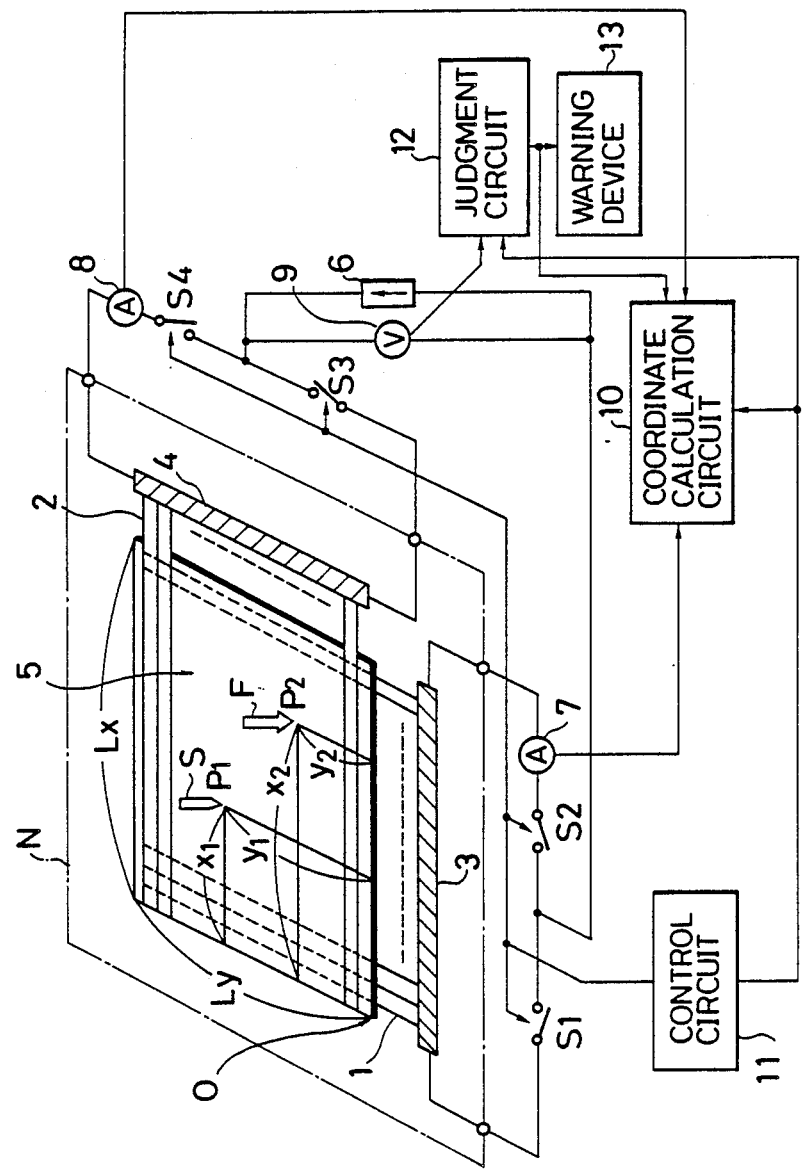
FIG. 3 illustrates the principle of operation of an embodiment of the present invention.

FIG. 3 illustrates the principle of operation of an embodiment of this invention. The illustrated input panel N is identical to that shown in and described with reference to FIG. 1 so its explanation will be omitted.

A constant-current source 6 is connected as shown in the drawing to supply a constant-current through the electrodes 1 and 2, and the resistive members 3 and 4, and current detection circuits 7 and 8 are provided to detect currents through the resistive members 3 and 4. A positional coordinate calculation circuit 10 is provided to receive the outputs from the current detection circuits 7 and 8 and to calculate the positional coordinate (x, y) of the point $P_1$ at which a stylus is applied. The positional coordinate calculation circuit 10 may be formed of a computer with a stored program to perform the required functions.

The apparatus of this embodiment is further provided with switches $S_1$, $S_2$, $S_3$, and $S_4$ connected to turn on and off the current flowing into or out of the X-coordinate detection resistive member 3 and the Y-coordinate detection resistive member, a voltage detection circuit 9 for detecting the voltage between the X-coordinate detection resistive member 3 and the Y-coordinate detection resistive member 4, and a control circuit 11 for controlling the switches $S_1$ to $S_4$, to be on and off in the sequence shown in Table 1, and to be all on. A judgement circuit 12 is further provided to receive the outputs of the voltage detection circuit 9 and the control circuit 11, and judges whether or not there has been a multiple input according to the voltages detected by the voltage detection circuit 9 when the currents are switched by the switches $S_1$, $S_2$, $S_3$ and $S_4$, i.e., when the switches $S_1$ to $S_4$ are in the respective states. The judgement circuit 12 may comprise a computer with a stored program to perform the required judgement and calculation therefor. A warning device 13 is connected to the judgment circuit 12 to produce an warning to the operator when multiple input is detected.

Next the principle of operation of this embodiment will be described.

Suppose that the voltage detection circuit 9 obtains the voltage detection values $v_1$, $v_2$, $v_3$, and $v_4$ when the switches $S_1$, $S_2$, $S_3$, and $S_4$ are in the four states listed in Table 1 below.

TABLE 1

| Condition | | | | Detected |
|---|---|---|---|---|
| $S_1$ | $S_2$ | $S_3$ | $S_4$ | voltage |
| ON | OFF | ON | OFF | $v_1$ |
| OFF | ON | OFF | ON | $v_2$ |
| ON | OFF | OFF | ON | $v_3$ |
| OFF | ON | ON | OFF | $v_4$ |

For a reason to be given later, when there is input at multiple points the relation $v_1+v_2=v_3+v_4$ is not satisfied.

Figure 4:
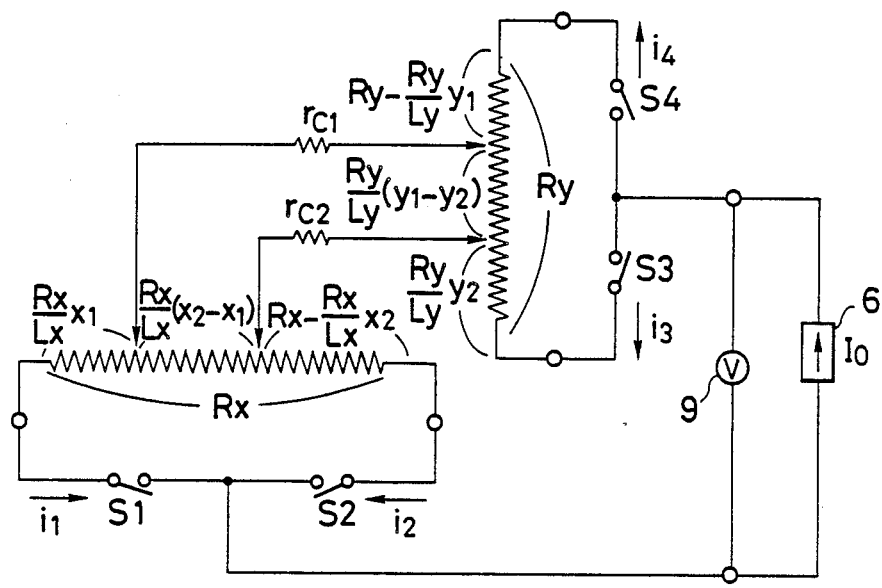
FIG. 4 shows an equivalent circuit when two input points are depressed.

Assume that pressure is now applied to two points, the point $P_1$ ($x_1$, $y_1$) and the point $P_2$ ($x_2$, $y_2$) in FIG. 3. At the points $P_1$ and $P_2$, the electrical resistance in the thickness direction of the pressure-sensitive sheet (or air gap) 5 is reduced, so the electrodes in the group of vertical electrodes 1 and the group of horizontal electrodes 2 are connected at these positions through contact resistances $r_{c1}$ and $r_{c2}$. The equivalent circuit at this moment is shown in FIG. 4. In FIG. 4, $x_1 \leq x_2$ and $y_2 \leq y_1$, but this restriction can be removed without loss of generality, due to the argument given below.

Figure 5A:
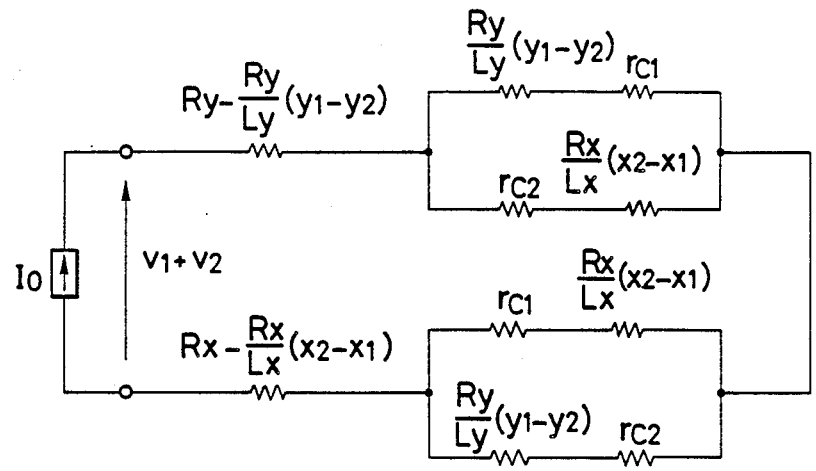
FIG. 5A, FIG. 5B, FIG. 6A and FIG. 6B show equivalent circuits for calculating $v_1+v_2$ and $v_3+v_4$ under the conditions in Table 1.
Figure 5B:
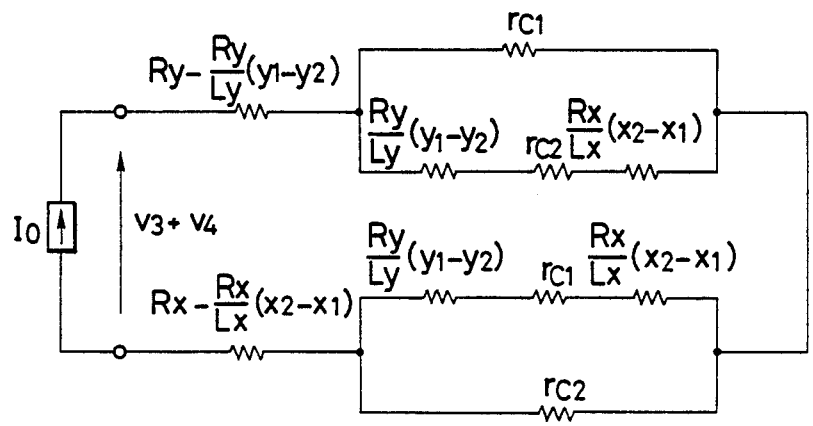
Figure 6A:
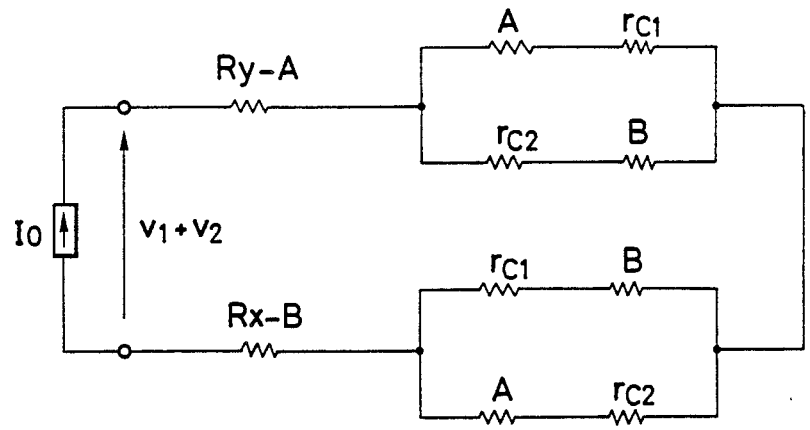
Figure 6B:
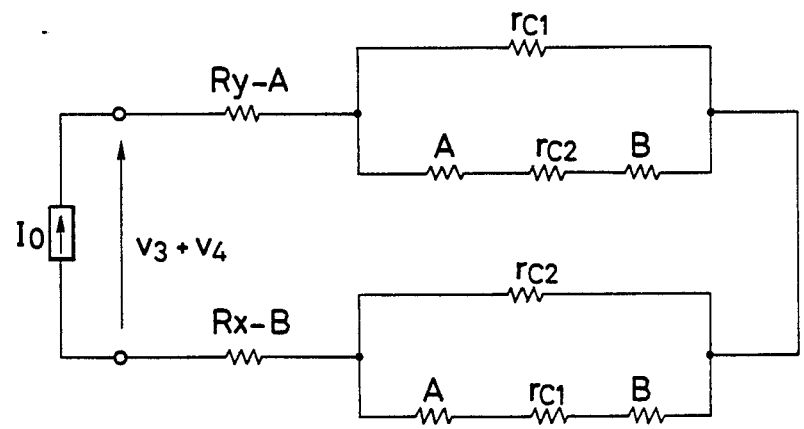

$v_1+v_2$ and $v_3+v_4$ can be calculated in the following way. In this calculation it is convenient to use the equivalent circuit in FIG. 5A for $(v_1+v_2)$ and FIG. 5B for $(v_3+v_4)$. Setting:

$$A=(R_y/L_y)(y_1-y_2) \qquad (3)$$

$$B=(R_x/L_x)(x_2-x_1) \qquad (4)$$

gives the equivalent circuit in FIG. 6A for $(v_1+v_2)$ and FIG. 6B for $(v_3+v_4)$.

The condition for $$v_1+v_2=v_3+v_4 \qquad (5)$$

to be true is given by equation (6):

$$\frac{(A+r_{c1})(B+r_{c2})}{A+B+r_{c1}+r_{c2}} + \frac{(A+r_{c2})(B+r_{c1})}{A+B+r_{c1}+r_{c2}} = \frac{r_{c1}(A+B+r_{c2})}{A+B+r_{c1}+r_{c2}} + \frac{r_{c2}(A+B+r_{c1})}{A+B+r_{c1}+r_{c2}} \qquad (6)$$

Equation (6) simplifies to the following:

$$AB=0 \qquad (7)$$

From equations (3) and (4), the conditions necessary for equation (7) to be true are:

$$x_1=x_2 \text{ and } y_1 \neq y_2 \qquad (8)$$

or $$x_1 \neq x_2 \text{ and } y_1=y_2 \qquad (9)$$

or $$x_1=x_2 \text{ and } y_1=y_2 \qquad (10)$$

Equation (10) represents a situation in which there is input at a single location. In a practical situation, one can assume that situations satisfying expressions (8) and (9) do not occur or the probability of occurrence of such situations is negligible if the pitch of the electrodes or the resolution is sufficiently small. Accordingly, one can assume that if equation (5) is satisfied the input is at a single location and if equation (5) fails to be satisfied an input at multiple points has occurred.

The judgment circuit 12 performs the above described calculation and the judgment.

In a practical system, an approximate equality, rather than a strict equality, is used for the judgment of whether or not there has been a multiple input. For instance, judgment is made whether or not the following relationship is satisfied:

$$|(v_1+v_2)-(v_3+v_4)| < e \quad (11)$$

where e is a predetermined value close to zero. The value of e can be determined on the basis of variations of the various parameters of the apparatus, including the resistivities of the X-coordinate and Y-coordinate detection resistive members.

Figure 2:
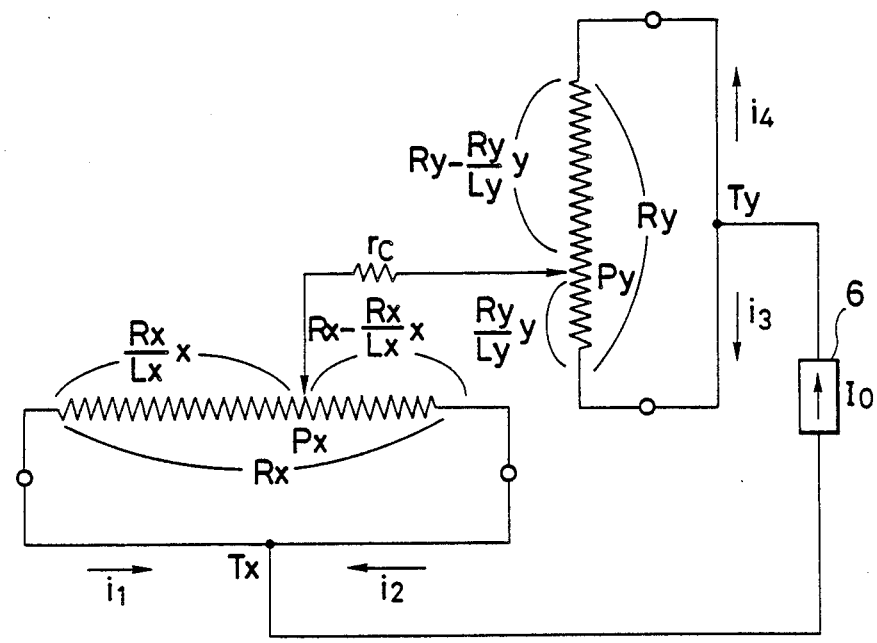
FIG. 2 shows an equivalent circuit when a single input point is depressed.

When expression (5) or (11) is satisfied, the judgment circuit 12 judges that there has been normal input at one point only, and supplies the coordinate calculating circuit 10 with a signal VI indicating that input is at a single location and valid. The coordinate calculating circuit 10 calculate the positional coordinate using the outputs of the current detection circuits 7 and 8 obtained when the switches $S_1$, $S_2$, $S_3$ and $S_4$ are all on. The calculated coordinate is output if the coordinate calculating circuit 10 receives the signal VI. The equation used for the calculation can be the same as that explained with reference to the prior art of FIG. 1 and FIG. 2.

When the expression (5) or (11) is not satisfied, the judgment circuit 12 judges that there has been a multiple input, and the result of the calculation of the coordinate is not output and instead a signal MI indicating that there has been a multiple input is output. Moreover, a warning device 13 is activated by the judgment circuit 12 to inform the operator of the multiple input.

The control circuit 11 may be arranged to send control signals to the switches $S_1$, $S_2$, $S_3$ and $S_4$ to operate in the sequence shown in the Table 1 and then to turn on all the switches, and sends the same control signals to the judgment circuit 12 and the coordinate calculating circuit 10 so that the judgment circuit 12 and the coordinate calculating circuit 10 makes the calculation and the judgment in accordance with the data at the appropriate timings.

In the above embodiment, the calculated coordinate is output when the judgment circuit 12 judges that input is at a single location. In a modification, the coordinate calculating circuit 10 may be enabled to perform the calculation of the coordinate when the signal VI is supplied.

The preceding discussion covered the case of input at two points, but there is no loss of generality in the case of three or more points because in these cases as well, equation (5) fails to be satisfied.

As explained in detail above, the provision of the switches $S_1$ to $S_4$, the voltage detection circuit 9, and the judgment circuit 12 enables input at multiple points to be detected, so even if during inputs with a stylus the operator inadvertently applies pressure elsewhere, positions not intended by the operator will not be detected. Thus, the major defect of the prior-art pressure-sensitive input apparatus can be overcome.

In the above description, it was assumed that the input is made by a stylus. But the invention is also applicable where the input is made by a finger.

What is claimed is:

1. A pressure-sensitive input apparatus comprising:
   vertical electrodes which are parallel with each other;
   horizontal electrodes which are parallel with each other, intersect said vertical electrodes and are separated from the vertical electrodes;
   the electrical resistance between said vertical electrodes and said horizontal electrodes being reduced at a location where a pressure is applied;
   an X-coordinate detection resistive member connected to the vertical electrodes;
   a Y-coordinate detection resistive member connected to the horizontal electrodes;
   current supply means for supplying an electric current through said vertical electrodes, said horizontal electrodes, said X-coordinate detection resistive member and said Y-coordinate detection resistive member;
   coordinate calculating means for detecting currents through said X-coordinate detection resistive member and said Y-coordinate detection resistive member and calculating the positional coordinate at which a pressure is applied;
   switching means for on-off control of the current flowing through both ends of the X-coordinate detection resistive member and the Y-coordinate detection resistive member;
   voltage detection means for detecting the voltage between the X-coordinate detection resistive member and the Y-coordinate detection resistive member;
   judgment means responsive to the voltage detection means for detecting multiple input according to the results obtained from the voltage detection means when the currents are switched by the switching means.

2. An apparatus according to claim 1, wherein said judgment means detects the multiple input according to the results obtained from the voltage detection means when the switching means are in respective states.

3. An apparatus according to claim 2, further comprising control means for controlling said switching means, wherein said judgment means is responsive to the control means to determine the states of the switching means.

4. An apparatus according to claim 1, wherein said current supply means has a first output terminal connected to first and second ends of said X-coordinate detection resistive member, and a second output terminal connected to first and second ends of said Y-coordinate detection resistive member.

5. An apparatus according to claim 4, wherein said X-coordinate detection resistive member and said Y-coordinate detection resistive member have a uniform lengthwise resistivity.

6. An apparatus according to claim 5, wherein said switching means comprises:
   a first switch interposed between said first output terminal of said current supply means and said first end of said X-coordinate detection resistive member,
   a second switch interposed between said first output terminal of said current supply means and said second end of said X-coordinate detection resistive member,
   a third switch interposed between said second output terminal of said current supply means and said first end of said Y-coordinate detection resistive member, and a fourth switch interposed between said second output terminal of said current supply means and said second end of said Y-coordinate detection resistive member.

7. An apparatus according to claim 6, wherein said voltage detection means is connected to detect the voltage across said first output terminal and said second output terminal of said current supply means, and said judgment means makes said judgment in accordance with whether or not the following relationship holds:

$$|(v_1+v_2)-(v_3+v_4)|<e$$

where $v_1$ is the voltage detected by said voltage detection means when said first switch is on, said second switch is off, said third switch is on and said fourth switch is off, $v_2$ is the voltage detected by said voltage detection means when said first switch is off, said second switch is on, said third switch is off and said fourth switch is on, $v_3$ is the voltage detected by said voltage detection means when said first switch is on, said second switch is off, said third switch is off and said fourth switch is on, $v_4$ is the voltage detected by said voltage detection means when said first switch is off, said second switch is on, said third switch is on and said fourth switch is off, and e is a predetermined value.

8. An apparatus according to claim 7, wherein the pitch of the electrode is so small that the probability of erroneous input at multiple locations where either the X-coordinate values or the Y-coordinate values are identical is negligible.

9. An apparatus according to claim 7, wherein said coordinate calculating means determines the X-coordinate x and the Y-coordinate by performing the following calculation:

$$x=L_x\cdot i_2/I_0$$

$$y=L_y\cdot i_4/I_0$$

where $L_x$ is the length of the effective input area in the direction of the horizontal electrodes, $L_y$ is the length of the effective input area in the direction of the vertical electrodes, $I_o$ is the current value of the current supply means when said first, second, third and fourth switches are all on, $i_2$ is the current through one end of the X-coordinate detection resistive member when said first, second, third and fourth switches are all on, and $i_4$ is the current through one end of the Y-coordinate detection resistive member when said first, second, third and fourth switches are all on.

10. An apparatus according to claim 9, wherein said current supply means is a constant-current supply means.

11. An apparatus according to claim 1, wherein said vertical electrodes and said horizontal electrodes are separated from each other by a pressure-sensitive sheet or air gap.

* * * * *